(12) United States Patent
Cahill

(10) Patent No.: US 8,393,203 B2
(45) Date of Patent: Mar. 12, 2013

(54) SYSTEMS AND METHODS FOR BUILT IN TEST EQUIPMENT FOR A BRAKE CONTROL SYSTEM

(75) Inventor: Eric D. Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 422 days.

(21) Appl. No.: 12/719,644

(22) Filed: Mar. 8, 2010

(65) Prior Publication Data

US 2011/0214496 A1   Sep. 8, 2011

(51) Int. Cl.
*G01M 17/00* (2006.01)
(52) U.S. Cl. ......................................................... 73/121
(58) Field of Classification Search .................... 73/121, 73/128, 129, 130
See application file for complete search history.

(56) References Cited

U.S. PATENT DOCUMENTS

| | | | |
|---|---|---|---|
| 4,252,014 A | 2/1981 | Ruof | |
| 4,979,391 A | 12/1990 | Drake et al. | |
| 5,086,277 A | 2/1992 | Hammerly | |
| 5,136,286 A | 8/1992 | Veneruso | |
| 5,279,152 A * | 1/1994 | Griffin | 73/121 |
| 5,299,452 A | 4/1994 | Caron et al. | |
| 5,717,134 A | 2/1998 | Schlickenmaier et al. | |
| 5,767,397 A | 6/1998 | Eisele | |
| 5,936,153 A | 8/1999 | Steckler et al. | |
| 5,965,807 A | 10/1999 | Yamashita et al. | |
| 5,974,878 A * | 11/1999 | Newell et al. | 73/462 |
| 6,043,661 A | 3/2000 | Gutierrez | |
| 6,134,956 A | 10/2000 | Salamat et al. | |
| 6,289,271 B1 | 9/2001 | Isono et al. | |
| 6,390,571 B1 | 5/2002 | Murphy | |
| 6,595,045 B1 | 7/2003 | Fuglewicz et al. | |
| 6,634,221 B2 | 10/2003 | Harris et al. | |
| 7,363,127 B2 | 4/2008 | Fogelstrom | |
| 7,555,375 B2 | 6/2009 | Pettersson et al. | |
| 2006/0108867 A1 | 5/2006 | Ralea | |
| 2008/0154470 A1 | 6/2008 | Goranson et al. | |
| 2008/0283346 A1 | 11/2008 | Ralea | |
| 2010/0090058 A1* | 4/2010 | Cahill et al. | 244/111 |
| 2010/0276988 A1* | 11/2010 | Cahill | 303/20 |
| 2010/0292889 A1 | 11/2010 | Cahill | |

FOREIGN PATENT DOCUMENTS

| | | |
|---|---|---|
| DE | 3340129 | 5/1985 |
| DE | 102008023651 | 11/2009 |
| EP | 1832853 | 9/2007 |
| GB | 2049203 | 12/1980 |
| GB | 2470251 | 11/2010 |

(Continued)

OTHER PUBLICATIONS

GB; Search Report dated Mar. 20, 2012 in Application No. GB1021196.9.

(Continued)

*Primary Examiner* — Eric S McCall
(74) *Attorney, Agent, or Firm* — Snell & Wilmer L.L.P.

(57) ABSTRACT

A method is disclosed that comprises severing an I/O channel between a brake system controller and an aircraft component; sending a test signal to the brake system controller; receiving, from the brake system controller, a feedback signal to the test signal; and determining an appropriateness of the feedback signal. A system is disclosed that comprises a brake system controller wrapped in a BITE region, wherein the BITE region comprises a testing module, a safety interlock region having an I/O channel between the brake system controller and another system, and a testing module capable of sending a test signal to the brake system controller.

6 Claims, 6 Drawing Sheets

FOREIGN PATENT DOCUMENTS

| | | |
|---|---|---|
| WO | 9421502 | 9/1994 |
| WO | 2007137693 | 12/2007 |

OTHER PUBLICATIONS

GB; Search Report dated Jun. 30, 2010 in Application No. GB0922032.8.

GB; Search Report dated Mar. 4, 2011 in Application No. GB1021196.9.

USPTO; Advisory Action dated Feb. 1, 2012 in U.S. Appl. No. 12/466,080.

USPTO; Final Office Action dated Nov. 30, 2011 in U.S. Appl. No. 12/466,080.

USPTO; Office Action dated Jun. 23, 2011 in U.S. Appl. No. 12/466,080.

\* cited by examiner

SYSTEMS AND METHODS FOR BUILT IN TEST EQUIPMENT FOR A BRAKE CONTROL SYSTEM

TECHNICAL FIELD

The present invention relates to systems and methods for testing brake control systems.

BACKGROUND

Modern aircraft braking systems often provide greater control, reliability and flexibility than systems of previous generations. However, to ensure optimum operation, the various components of modern braking systems should undergo regular testing. In this regard, regular testing may detect the need to replace wear items, identify components with the potential for malfunction, and identify potential areas for recalibration.

Conventional testing of an aircraft brake system involves taking the aircraft out of service and either physically inspecting components and/or using the brake system while the aircraft remains grounded and parked. Such methods necessitate the loss of use of the aircraft during testing, while involving the labor and cost of technicians that detect potential issues.

Accordingly, there exists a need for testing systems and methods that allow for real time brake system testing.

SUMMARY

In various embodiments, a method is provided comprising severing an I/O channel between a brake system controller and an aircraft component, sending a test signal to the brake system controller, and determining a response signal of the brake system controller to the test signal.

In various embodiments, a system is provided comprising a brake system controller wrapped in a BITE region, wherein the BITE region comprises a testing module, a safety interlock region having an I/O channel between the brake system controller and another system, and a testing module capable of sending a test signal to the brake system controller.

In further embodiments, a method comprises disposing a selectively severable I/O channel between a brake system controller and an aircraft component, coupling the brake system controller with a BITE region, and establishing a safety interlock region by disposing a non-severable I/O channel between the brake system controller and the aircraft component. The BITE region may comprise a testing module capable of sending a test signal to the brake system controller.

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the invention, it should be understood that other embodiments may be realized and that logical, chemical and mechanical changes may be made without departing from the spirit and scope of the invention. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods are disclosed herein that provide for testing a brake control system. In accordance with various embodiments, by testing a brake control system, the brake control system may be calibrated appropriately and/or potential areas of concern may be revealed. The systems and methods disclosed herein are suitable for use with various aircraft braking systems, although there may be utility for use with other braking systems.

During conventional testing of an aircraft brake system, an aircraft is typically taken out of service and either physically inspected or the brake control system is tested while the aircraft remains grounded and parked. However, as noted above, such methods necessitate the loss of use of the aircraft during testing, while involving the labor and cost associated with technicians to detect potential issues.

However, as it has been presently found, a brake control system may be wrapped in (or encompassed by) a built in test equipment system (a "BITE" system) for in-use testing of the brake control system. In various embodiments, the BITE system may control the in/out ("I/O") channels to the brake control system and may sever/reestablish those channels so that testing may occur in real time, and often, without the need (or minimal need) to take an aircraft of service. Accordingly, by using a BITE system, an aircraft brake control system may be appropriately maintained without excess down time.

Figure 1:
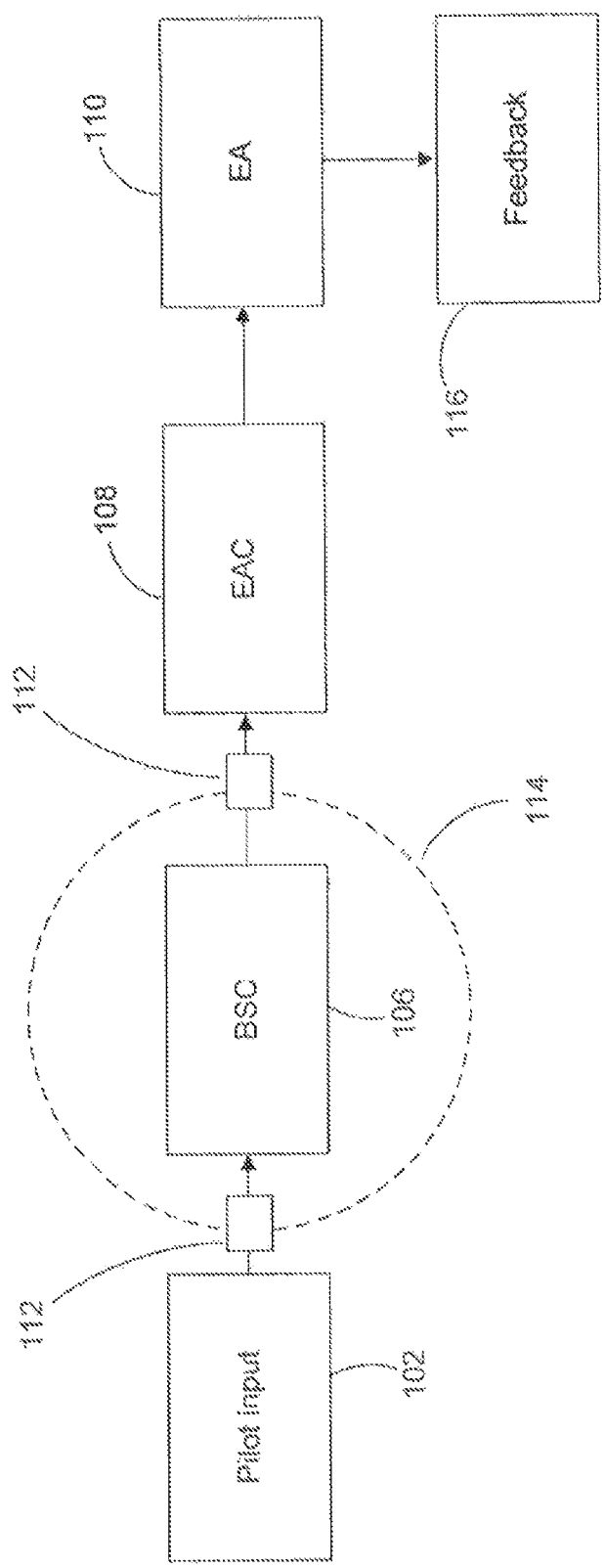
FIG. 1 illustrates a brake control system and a BITE region in accordance with an embodiment.

With reference to FIG. 1, an aircraft braking control system includes at least one brake system controller 106, and frequently, at least two brake system controllers may be used for redundancy purposes. Brake system controller 106 is in communication with various components that relay pilot input 102 to brake system controller 106. For example, pilot input 102 may comprise a signal produced by one or more aircraft brake indicators. In addition to pilot input 102, input from other aircraft systems (not shown) may be relayed to brake system controller 106.

In this regard, an aircraft brake indicator may be any device that allows a pilot to input braking commands. For example, an aircraft brake indicator may be one or more aircraft brake pedals.

Brake system controller 106 may provide an input/output interface ("I/O interface") to other components of an aircraft braking system. An I/O interface may comprise one or more I/O channels. For example, brake system controller 106 may be in communication (e.g., electrical communication) with components in a cockpit of the aircraft (e.g., an aircraft brake pedal) and/or other portions of an aircraft braking system (e.g., electromechanical actuator controller 108). Such communication may be provided by, for example, the I/O interface (implemented using, for example, a bus or a network). Signals from a brake pedal (e.g., in response to pilot input 102) may be received by the brake system controller via one or more I/O channels. An I/O channel may be any means of electrical communication. For example, an I/O channel may comprise a wire connection or a wireless connection (e.g., via an RF transceiver). An I/O channel may be severed transiently by interrupting an electrical connection, for example, by canceling the interruption. Accordingly, the severing of an I/O channel may be a reversible process. One or more I/O channels of an I/O interface may be reversibly severed at a given time.

In addition, brake system controller 106 may contain a computing device (e.g., a processor) and an associated memory. The associated memory may contain executable code for performing braking control. The associated memory may comprise an article of manufacture including a computer-readable medium having instructions stored thereon that, if executed by a computing device (e.g., a processor), cause the computing device to perform various methods.

As noted above, in an embodiment and with reference to FIG. 1, a brake system controller may be in communication with one or more electromechanical actuator controllers. For example, brake system controller 106 may be in communication with electromechanical actuator controller 108. An electromechanical actuator controller, such as electromechanical actuator controller 108, may contain a computing device (e.g., a processor) and an associated memory. The associated memory may comprise an article of manufacture including a computer-readable medium having instructions stored thereon that, if executed by a computing device (e.g., a processor), cause the computing device to perform various methods. The associated memory may contain executable code for converting braking commands into a motor current command.

An electromechanical actuator controller, such as electromechanical actuator controller 108, may provide a drive signal to one or more electromechanical actuators (e.g., electromechanical actuator 110) of an aircraft brake to drive an electromechanical actuator to a commanded position. Thus, electromechanical actuator 110 may apply braking force directly.

In various embodiments, brake system controller 106 may communicate with electromechanical actuator controller 108 by sending a command signal to electromechanical actuator controller 108 via an I/O interface. The command signal may contain one or more commands. For example, the command signal may command a certain amount of force be applied by the electromechanical actuators. Accordingly, brake system controller 106 may contain various information pertaining to an aircraft, such as weight, make, model, and aircraft brake system configuration to assist in making this determination.

In various embodiments, feedback 116 may be generated by electromechanical actuator 110 and, although not shown in FIG. 1, by electromechanical actuator controller 108.

A BITE system (also referred to herein as a BITE region) may be any system that allows any portion of a brake control system (e.g., brake system controller) to be at least partially and reversibly disconnected from another aircraft system or component. With reference again to FIG. 1, BITE region 114 is shown with BITE components 112. A BITE system may allow for the severing and reestablishing of I/O channels or an I/O interface. A BITE system may comprise one or more switches, connectors, gateways, or other devices that allow for the selective, reversible severing of an I/O channel. For example, BITE components 112 allow for the selective, reversible severing of an I/O channel.

A BITE system may further comprise a testing module. A testing module may contain a computing device (e.g., a processor) and an associated memory. The associated memory may contain executable code for performing various actions, including the sending and receiving of test signals and the creation and execution of test scripts. The associated memory may comprise an article of manufacture including a computer-readable medium having instructions stored thereon that, if executed by a computing device (e.g., a processor), cause the computing device to perform various methods. In various embodiments, a brake system controller may comprise a testing module and, in such embodiments, the BITE system need not necessarily comprise a testing module.

In various embodiments, a testing module may be configured to send and receive test signals. A test signal may be any signal that encodes a command for an action performed for testing, calibration, optimizing, or other purposes that are not, at the time the testing signal is sent, needed for the immediate operation of an aircraft. In this regard, a test signal may command an aircraft component to perform a task. For example, a test signal may command an electromechanical actuator to actuate and/or may command a servo valve to perform a task. In various embodiments, two or more test signals may be arranged in a particular order to comprise a test script.

In various embodiments, a testing module may also be configured to receive feedback (also referred to herein as a feedback signal or output signal) from an aircraft component and/or brake system controller. Feedback may be delivered electronically, for example. Feedback may comprise any information relating to an aircraft component, such as its history, current status, or intended future status. Feedback may be sent to a testing module or, with reference to FIG. 1, to brake system controller 106, for example, in response to a test signal.

Feedback may be used to calibrate, tune, optimize, or otherwise alter the performance of various aircraft components. For example, feedback may comprise the actual pressure applied at an actuator. Feedback may also be used to detect when a component may require maintenance or a corrective action such as a repair. Feedback may also comprise a signal that encodes a component failure.

A testing module or other BITE system component may receive feedback to determine the appropriateness of the feedback. Appropriateness, as used herein, includes determining if feedback is consistent with a set of predetermined, "expected" feedback values. As feedback may represent a real-world event, result or condition, it may be useful to determine if the feedback result comports with the expected event, result or condition. Feedback that does not comport with the expected event, result or condition may be labeled as a failure, while feedback that does comport with the expected event, result or condition may be labeled as a pass.

For example, if a test signal commanded a braking pressure of, for example, 100 lbs/in$^2$ within a 3 lbs/in$^2$ tolerance and a feedback signal indicated that only 50 lbs/in$^2$ was actually applied, the testing module or other BITE system component may determine that the feedback is inconsistent with the "expected" value of the feedback. The testing module or other BITE system component may then report this inconsistency (i.e., failure) to other aircraft components, such as a cockpit component. Alternatively, using the same situation, if a feedback signal returned a value of 99 lbs/in$^2$, then the testing module or other BITE system component may determine that the feedback was appropriate and may record this in a log.

In various embodiments, a testing module or brake system controller 106 may send a test signal to an aircraft component (e.g., an actuator), the aircraft component may take an action based upon the test signal, and feedback may be sent to the testing module or brake system controller for analysis.

For example, a testing module or brake system controller 106 may send a test signal to hydraulic servo valves. Data collected during testing may include phase lag (lag from command to response), step response (e.g., 0% commanded to x % commanded), and output pressure. These data may be used to determine "valve health." For example, the output pressure may be recorded and performance may be compared to one or more of the following: 1) known test cases (i.e., experimentally derived data), 2) predicted envelopes based on envelopes of operation, 3) trends based on past valve performance, and 4) performance compared to "peer" valves within the same aircraft (i.e., other brake control valves).

In further embodiments, a testing module or brake system controller 106 may send a test signal simulating a sensor failure. For example, a brake system controller 106 may receive a signal indicating a brake pressure of 1000 psi when there is no input command for braking, thus indicating an uncommanded braking failure. Brake system controller 106, if functioning as designed, should identify the uncommanded braking failure and respond accordingly. In various embodiments, electric brake tests and hydraulic valve tests are contemplated.

Figure 2:
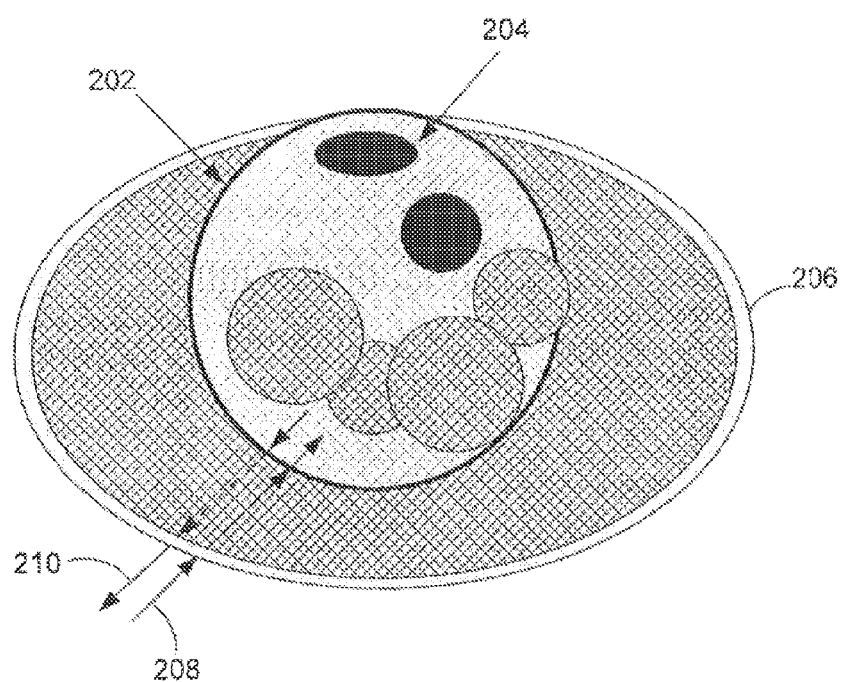
FIG. 2 illustrates an additional aspect of a brake control system and a BITE region in accordance with an embodiment.

Now referring to FIG. 2, BITE region 206 is shown wrapping brake system controller 202. I/O channels 208 and 210 are shown entering BITE region 206 and connecting to brake system controller 202. BITE region 206 may reversibly sever I/O channels 210 and 208. While severed, BITE region 206 may (through, for example a testing module (not shown)) send test signals through I/O channels 210 and 208 to brake system controller 202.

In certain situations, for safety, it is desirable to ensure that testing may be interrupted by external factors (e.g., pilot input). For example, there may be situations where a pilot may need to unexpectedly command braking. If testing is in progress and such a situation arises, it is advantageous to have a system by which testing could be interrupted and the brake control system could return to pilot control. In various embodiments, safety interlock 204 allows brake system controller 202 to communicate with other aircraft components. For example, safety interlock 204 may communicate directly with critical aircraft signals, without intervention of BITE region 206. Thus, safety interlock 204 may comprise I/O channels between aircraft components that BITE region 206 may not sever, thus providing uninterruptible I/O channels. In such embodiments, safety interlock 204 may thus comprise I/O channels that are redundant with respect to the severable I/O channels of BITE region 206. In various embodiments, such redundancy enhances safety and ensures that signals, such as critical signals, have an alternate pathway that bypasses BITE region 206. In various embodiments, BITE region 206 may detect the use of safety interlock 204 and thus determine that any testing may be ceased. Accordingly, BITE region 206 may reestablish one or more severed I/O channels responsive to the use of safety interlock 204.

Safety interlock 204 may also detect signals from other aircraft components and detect patterns indicative of a scenario where testing may cease. For example, if a pilot depresses a brake pedal during flight and aircraft altitude is dropping, the safety interlock 204 may notify the BITE region to reestablish I/O channels and cease testing.

In various embodiments, BITE region 206 may determine that one or more tests may be performed. For example, tests may be programmed to occur over varying time intervals. Testing may be performed using test scripts that arrange several testing procedures into a particular order.

Prior to conducting a test, BITE region 206 (through, for example, a testing module), may determine if an aircraft's current state will accept the request for the test the aircraft's brake control system. For example, a BITE system may determine if the aircraft is parked, taxiing, taking off, flying, landing, or on approach for landing. In certain instances, the BITE system may determine that testing should not occur.

If it is appropriate to run a test, BITE region 206 may then reversibly sever one or more I/O channels (e.g., I/O channels 210 and 208) to prepare for testing. Testing may comprise generating and sending test signals. For example, test signals may comprise signals encoding commands typically associated with parking, taxiing, taking off, flying, landing, or on approaching for landing. In various embodiments, test signals may also encode various data related to aircraft status. For example, test signals may comprise wheel speed signals, landing gear WOW ("weight-on-wheel") signals, landing gear downlock signals, TQA ("Throttle Quadrant Assembly") signals, throttle position signals, and the like.

In various embodiments, and as described herein, BITE region 206 may then receive feedback. Feedback may be used to compare and evaluate actual system responses to expected responses. BITE region 206 may then record, communicate and/or summarize the results of the test.

Figure 3:
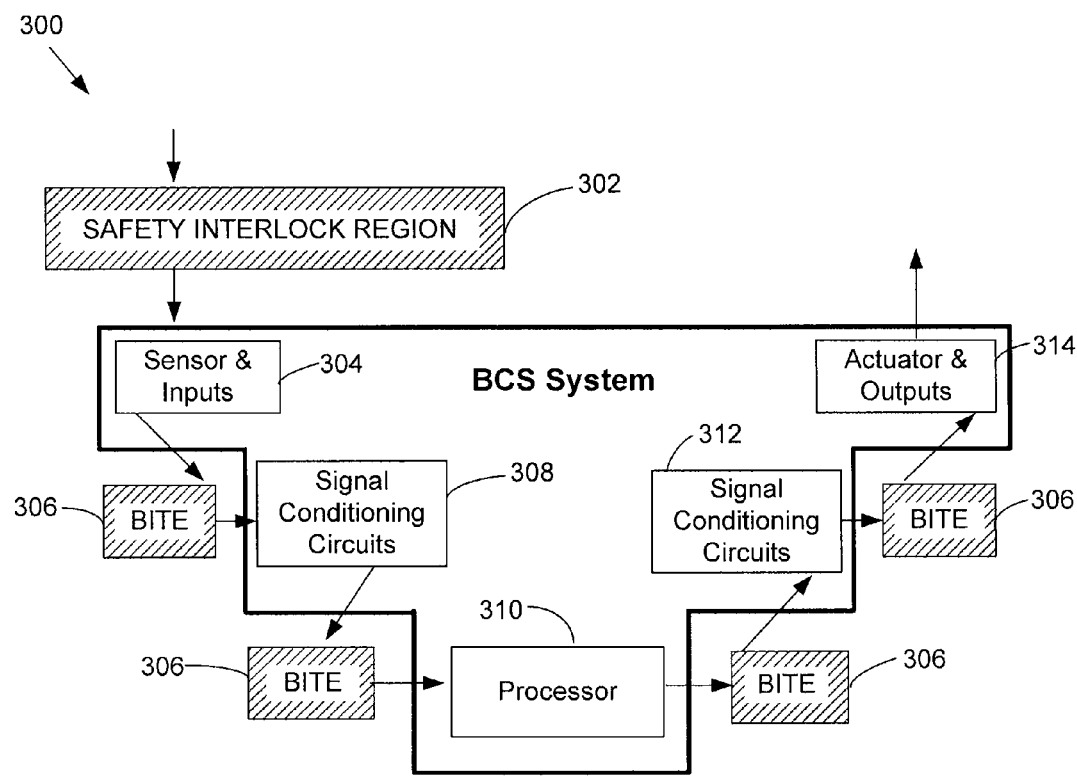
FIG. 3 illustrates a more detailed view of a brake control system and a BITE region in accordance with an embodiment.

With reference to FIG. 3, brake control system 300 is shown. The brake control system comprises a brake system controller, shown as processor 310. The brake control system also comprises sensor and inputs 304 and signal conditioning circuits 308, each of which is in electrical communication with BITE system 306. The brake control system further comprises signal conditioning circuits 312 and actuator outputs 314, each of which is in electrical communicate with BITE system 306. Safety interlock 302 is in electrical communication with sensor and inputs 304 and, as shown, this connection is not made via BITE 306.

As shown in FIG. 3, BITE system 306 is in communication with various brake control system components (e.g., signal conditioning circuits 308) and may, accordingly, selectively sever or reestablish I/O channels of a brake control system. The BITE system may selectively sever or reestablish I/O channels directly to or from a brake system controller, as shown in the interaction between BITE 306 and brake system controller 310, or the BITE system may selectively sever or reestablish I/O channels of other brake control system components, as shown in the interaction between BITE 306 and sensor and inputs 304. Also as shown, safety interlock 302 may bypass BITE 306 so that operation of BITE may be modified should safety reasons so require.

For example, when it is determined that running a test is appropriate, a BITE system may sever I/O channels and a test script may be executed. The test script may comprise test signals that command taxi stops, so the brake control system would function as if the aircraft were in a taxi maneuver on a runway. The test script may then indicate that the throttles are moved forward for takeoff power and that the wheel speed has increased, simulating a take off. The test script may further comprise a test signal encoding a weight on wheels signal that reports that the wheels have left the ground, further simulating takeoff. Further, a test signal may indicate that the landing gear has been retracted. A test signal may indicate that the aircraft flaps have been lowered and that the throttles have been set to idle, indicating an imminent landing. In response, the brakes may be applied. The aircraft's responses to these events may be recorded and evaluated to determine abnormalities or other areas of concern.

Figure 4:
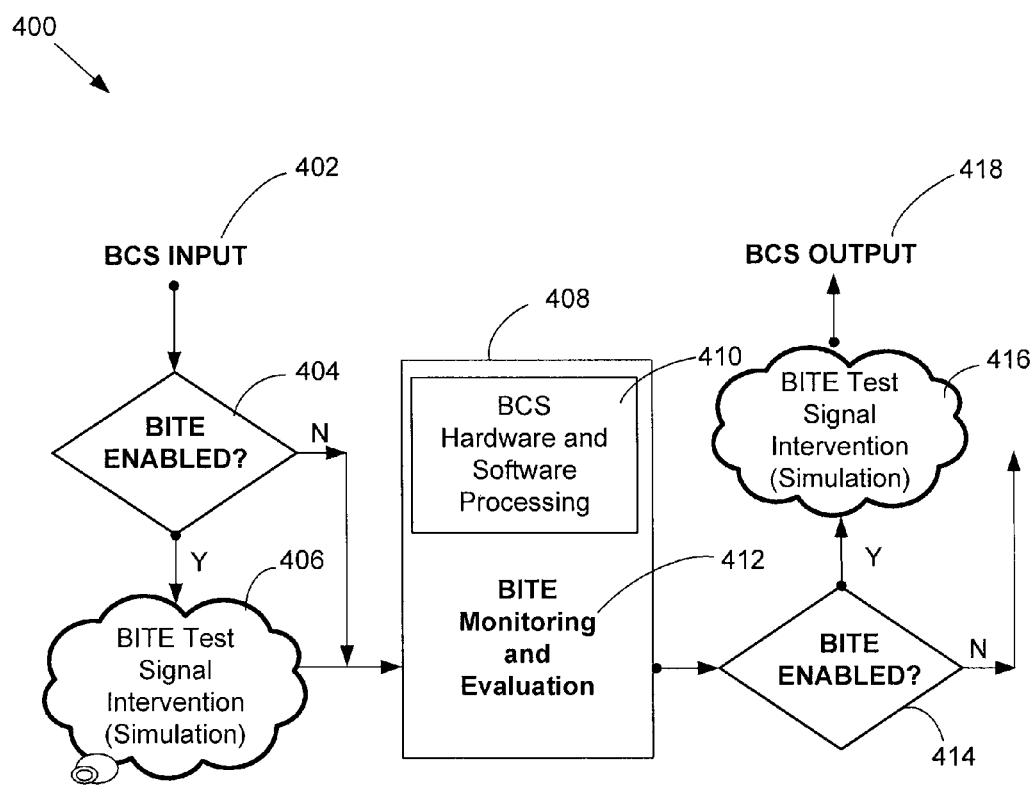
FIG. 4 illustrates a use scenario of a brake control system and a BITE region in accordance with an embodiment.

An example of BITE operation 400 is shown in FIG. 4. BCS input 402 is forwarded to BITE Enabled decision point 404. If BITE is enabled, it is understood that BCS input is 402 is a simulation per BITE simulation point 406. Accordingly, in a simulation, BCS input 402 comprises a test signal. If BITE is not enabled, BCS input may proceed to the brake control system 408. Within brake control system 408, BCS hardware and software 410 process the BCS Input 402 and determine an appropriate response. BITE monitoring and evaluation 412 monitors BCS hardware and software 410 and BCS input 402 when BITE is enabled.

BCS hardware and software 410 may prepare a signal responsive to BCS input 402. Such a signal may be passed to BITE Enabled decision point 414. If BITE is not enabled, the signal may be forwarded to another aircraft component as BCS output 418. If BITE is enabled, BITE may intervene at point 416 to monitor and/or alter the output signal. The output of point 416 is BCS output 418.

Figure 5:
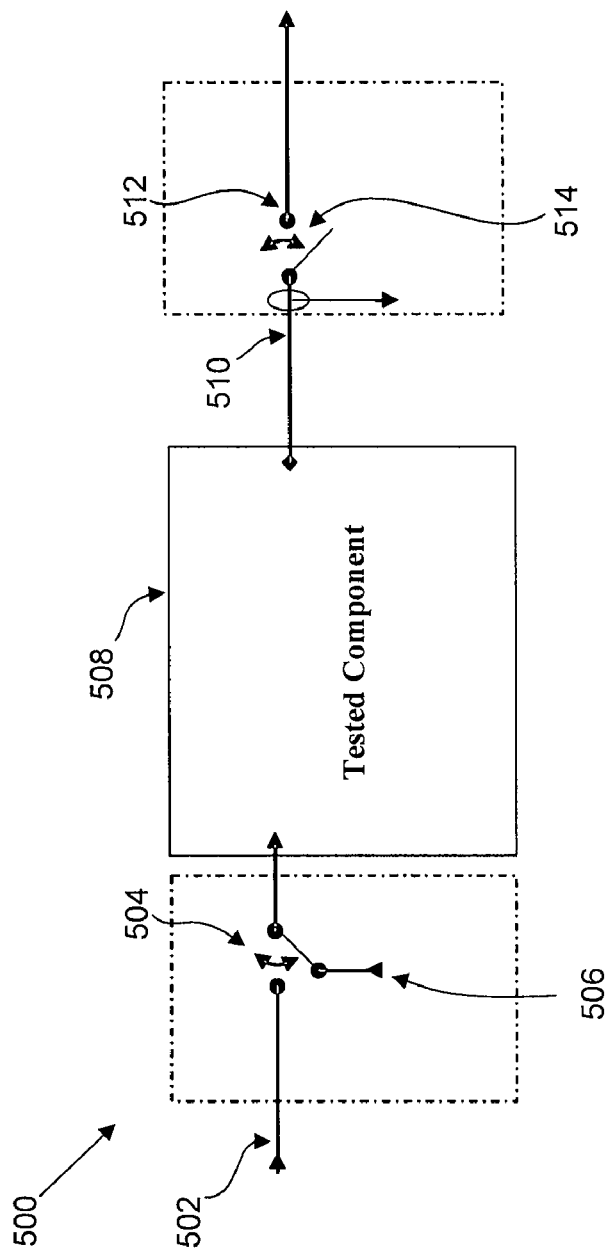
FIG. 5 illustrates use of a brake control system and a BITE region in accordance with an embodiment.

With reference to FIG. 5, BITE operation example 500 is shown. I/O channel 502 exists between an aircraft component and tested component 508. I/O channel 512 exists between tested component 508 and an aircraft component, which may or may not be the same aircraft component involved with I/O channel 502. I/O channel 502 may be selectively severed at point 504 while I/O channel 512 may be selectively severed at point 514. Points 504 and 514 may provide access to a BITE region (not shown) comprising one or more BITE components. As described above, various BITE components may generate test signals, receive feedback signals, and evaluate feedback signals.

During testing, I/O channel 502 may be selectively severed at point 504. The BITE region may introduce test signal 506 at point 504. Test signal 506 is relayed to tested component 508. Tested component 508 may then respond to test signal 506 and produce feedback signal 510. Feedback signal 510 may be routed to the BITE region at point 514. The BITE region may then record feedback signal 510 and evaluate it accordingly.

Figure 6:
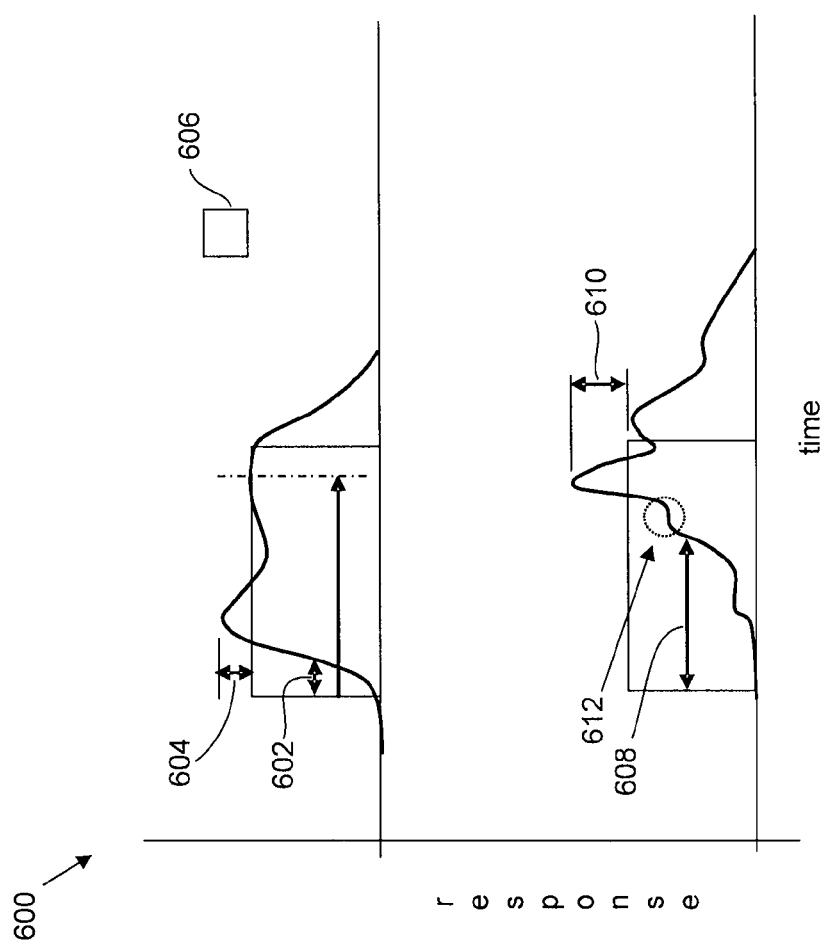
FIG. 6 illustrates a properly functioning valve response in the top graph and a malfunctioning valve response in the bottom graph.

Evaluation of feedback signals may be performed in any suitable manner, as elsewhere described herein. For example, FIG. 6 depicts test evaluation 600. Test evaluation 600 comprises a comparison of a properly functioning valve response (top graph) and a malfunctioning valve response (bottom graph). One or more properly functioning valve response profiles may be stored in a BITE region's memory for comparisons to future testing. The stored properly functioning valve response profiles may be derived from experimental data or may comprise previous "known good" results of the same tested valve.

With continued reference to the top graph of FIG. 6, a properly functioning valve response is shown. Time is shown on the x axis while response is shown on the y axis. Response may be determined by feedback signals. The command box 606 illustrates the commanded time and commanded response. For demonstration purposes, response is depicted as a generic indicator for the action of a tested component, although, in various embodiments, response could represent, for example, applied brake force.

Lag 602 illustrates the lag time between test signal transmission and the beginning of a response. Overshoot 604 illustrates the difference between the commanded response and the response produced. In various embodiments, an overshoot and/or a lag within a certain range is considered acceptable.

With reference now to the bottom graph of FIG. 6, a malfunctioning valve response is shown. Time is again shown on the x axis while response is again shown on the y axis.

Lag 608 illustrates the lag time between test signal transmission and the beginning of a response. As shown, lag 608 is larger than lag 602, which may indicate a problem with the tested component. Overshoot 610 illustrates the difference between the commanded response and the response produced. As shown, overshoot 610 is greater than overshoot 604. The BITE region may then determine that a malfunction is occurring. Point 612 illustrates an aberration in the response. In a test of a valve, such an aberration may indicate a "sticky" valve. The BITE region may use this information to determine that a malfunction is occurring and, moreover, to identify the type of malfunctioning occurring.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
   establishing a safety interlock between a brake system controller and an aircraft component;
   severing an I/O channel between the brake system controller and the aircraft component;
   sending a test signal to the brake system controller;
   receiving, from the brake system controller, a feedback signal to the test signal; and
   determining an appropriateness of the feedback signal.

2. The method of claim 1, further comprising reestablishing the I/O channel.

3. The method of claim 1, wherein the feedback signal relates to a least one of an electromechanical actuator, an electromechanical actuator controller, and a servo.

4. The method of claim 1, further comprising sending a command signal from the brake system controller through the safety interlock to the aircraft component.

5. The method of claim 1, wherein the test signal commands an actuator to actuate.

6. The method of claim 1, further comprising generating a test script comprising test signals with a testing module.

* * * * *